Feb. 16, 1943.                T. BROWN ET AL                    2,311,516
                        HYDRAULIC CONTROL MECHANISM
                     Filed Sept. 27, 1941         3 Sheets-Sheet 1
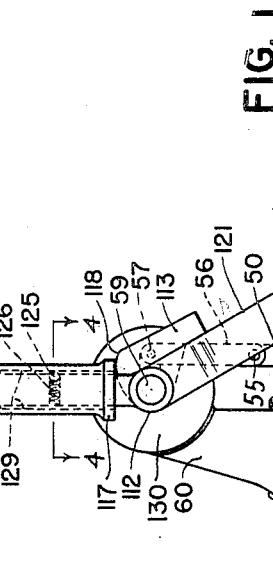
INVENTORS
THEOPHILUS BROWN &
FRANK T. COURT
BY
ATTORNEYS

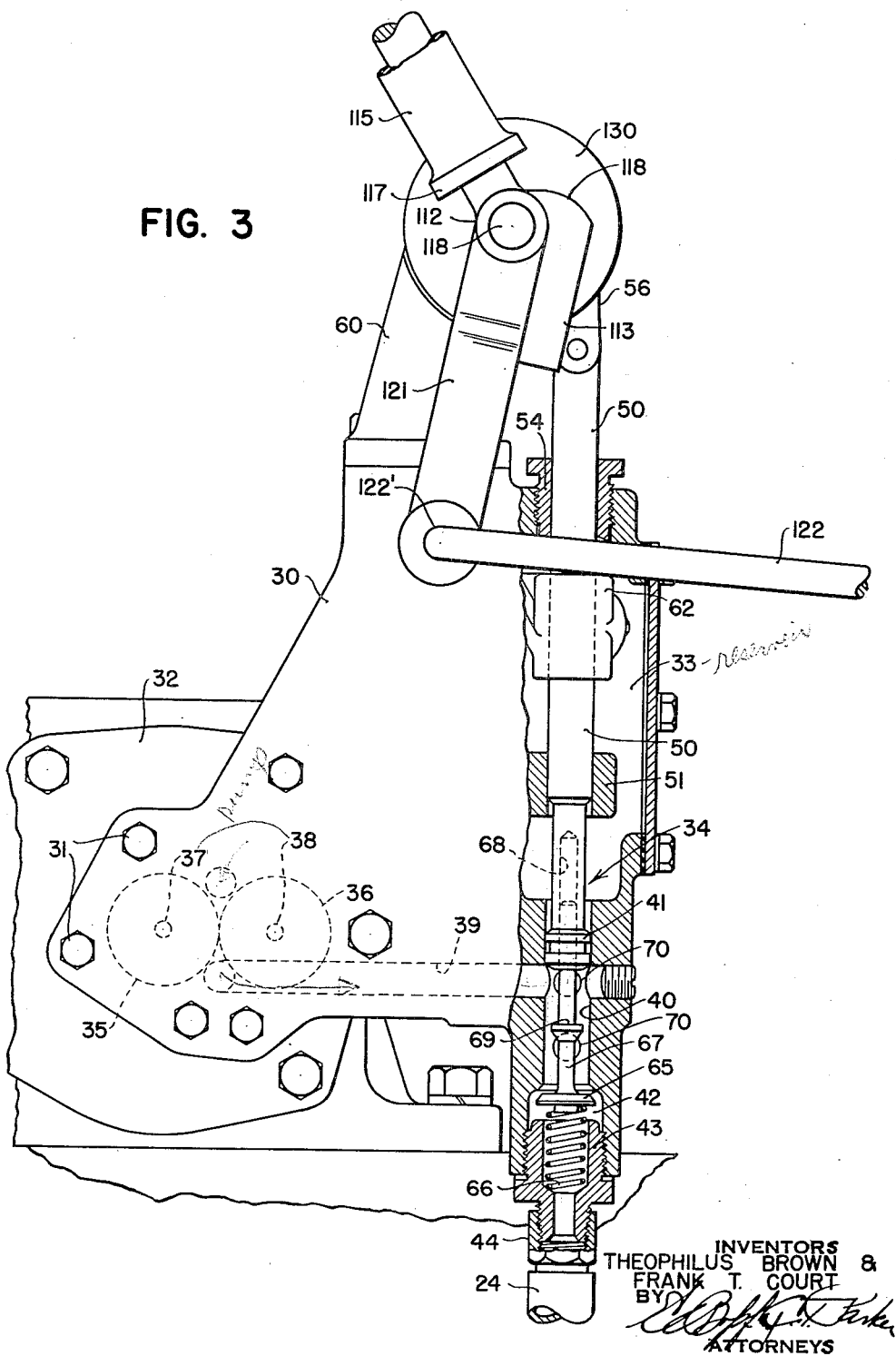

UNITED STATES PATENT OFFICE 2,311,516

HYDRAULIC CONTROL MECHANISM

Theophilus Brown and Frank T. Court, Moline, Ill., assignors to Deere & Company, Moline, Ill., a corporation of Illinois Application September 27, 1941, Serial No. 412,554

8 Claims. (Cl. 121—38)

The present invention relates generally to control mechanism and more particularly to a novel control device for hydraulic mechanism, in the nature of an improvement in the hydraulic mechanism shown and described in U. S. Patent No. 2,249,807, granted July 22, 1941, to Theophilus Brown, and reissued February 10, 1942, as Re. 22,019.

The mechanism disclosed herein and in the above mentioned patent, is applicable to power lift mechanism for tractors and the like for moving implements associated with the tractor between working and transport positions, although we do not intend our invention to be limited to this particular application. In the operation of many ground working tools and the like, it is necessary to accurately maintain the working depth of the tool at a predetermined setting, but to frequently raise the tool out of the ground and return it to the predetermined setting, such as when turning the tractor at the end of a crop row or furrow. It is also desirable to be able to easily change the predetermined setting and thereafter return the implement to the new setting after having raised it to transport position.

In the Brown patent, above mentioned, a control mechanism for a power lift device is disclosed, which is capable of performing these functions. The principal object of the present invention relates to the provision of a simpler control mechanism which is easier to operate and less expensive to manufacture. More specifically, it is an object of the present invention to provide a control lever which is manually operable to effect a raising and lowering of the power lift mechanism, with an adjustable handle which, by moving the same relative to the control lever, controls the limit to which the power lift mechanism lowers the implement for the purpose of setting its operating position with respect to the ground level.

These and other objects and advantages of our invention will be apparent to those skilled in the art after a consideration of the following description, in which reference is had to the drawings appended hereto, in which—

Figure 1 is a side elevational view of a hydraulic mechanism embodying the principles of the present invention;

Figure 3 is a side elevational view, partly in section, showing some of the details of the valve control mechanism; and Figure 4 is a sectional view drawn to an enlarged scale taken along a line 4—4 in Figure 1.

Figure 2:
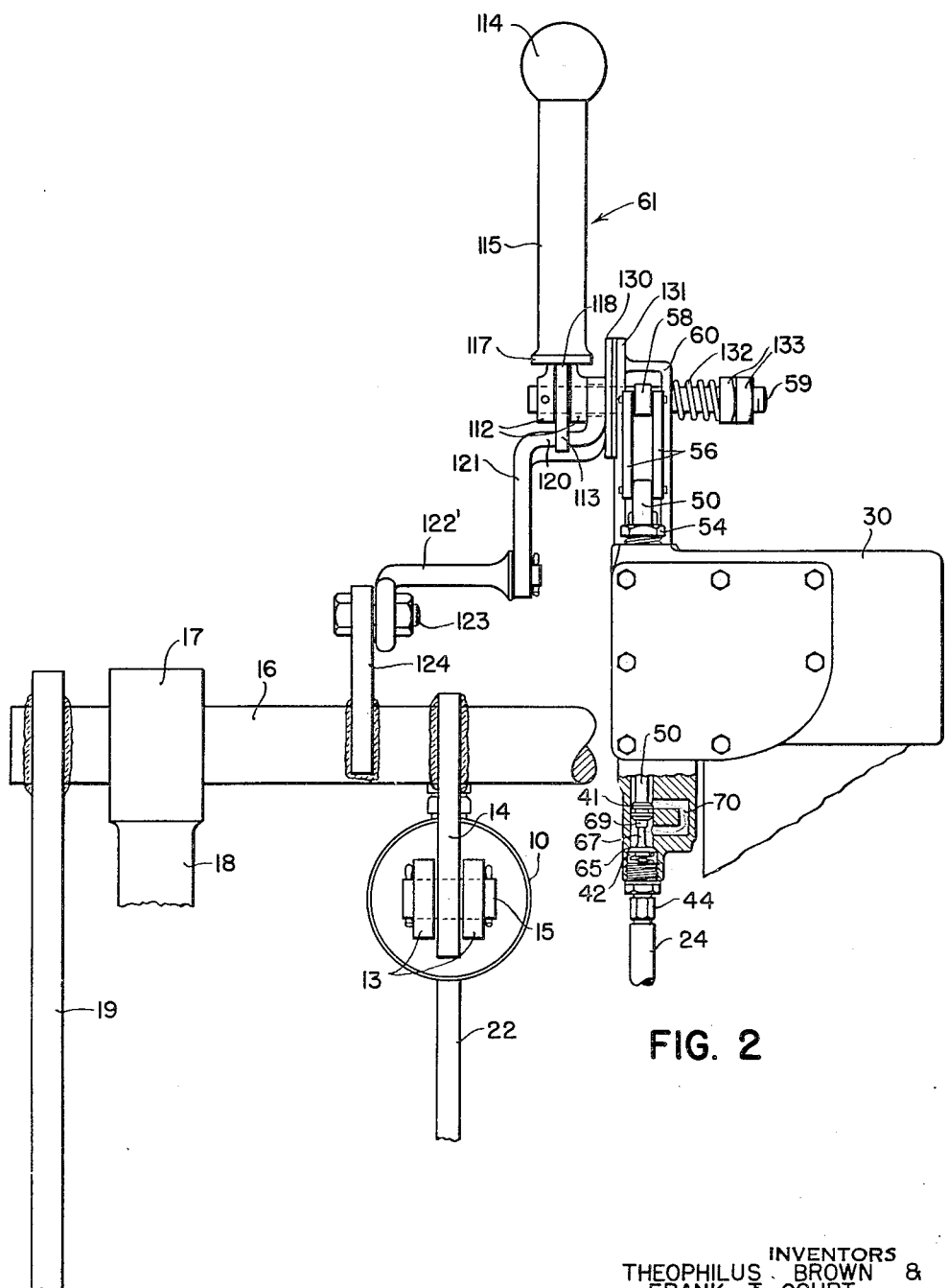
Figure 2 is an end elevational view of the mechanism shown in Figure 1.

Referring now to the drawings, the power lift mechanism includes a hydraulic cylinder 10, within which is slidably disposed a cooperative piston 11, attached to a suitable piston rod 12. The piston rod is connected at its outer end to a connecting head including a pair of spaced connecting lugs 13, between which is disposed an actuating arm 14 pivotally connected thereto by means of a pivot pin 15. The arm 14 is rigidly fixed, as by welding, to a rock shaft 16 which is supported in a suitable bearing block 17 carried on a pedestal 18. A lifting arm 19 is also rigidly fixed to the rock shaft 16 and is adapted to be connected to the implement which is to be lifted by power through the piston and cylinder. The opposite end of the cylinder 10 is provided with a suitable head 20 having a supporting lug 21 pivotally connected to a support 22 by means of a pivot pin 23.

Hydraulic fluid, such as oil, is admitted under pressure through a flexible connecting hose 24 to the closed end of the cylinder 10 and acts against the piston 11 to push the latter to the right, as viewed in Figure 1, thereby transmitting a force tending to rotate the rock shaft 16 in a counterclockwise direction, thereby raising the arm 19 and the implement which may be connected thereto. To lower the implement, the oil or other fluid is released and allowed to flow out of the cylinder through the hose 24, whereupon the weight of the implement forces the arm 19 downwardly.

Oil is supplied to the cylinder 10 by any suitable pump and valve mechanism, preferably a mechanism shown and described in an application, Serial No. 398,539, filed June 18, 1941, by J. D. Johnson. Referring particularly to Figure 3, the pump and valve mechanism comprises a cast metal housing 30 fastened by bolts 31 to the governor housing 32 of a tractor. The housing includes a reservoir 33 within which is disposed suitable valve mechanism, indicated in its entirety by reference numeral 34 and which will be described later in more detail. A positive displacement type gear pump, indicated by a pair of gears 35, 36 mounted on shafts 37, 38 journaled in the housing 30, draws oil from the reservoir 33 and forces the latter through a high pressure duct 39 within the housing 30. One of the gear shafts 37 is coupled to the shaft of the governor and is driven thereby.

The high pressure duct 39 extends horizontally through the housing and intersects a vertically disposed bore 40, within which is slidably disposed a piston valve 41, slidable within the bore 40 from the position shown, above the duct 39, downwardly past the latter to a position within the bore 40 below the duct 39. The bore 40 communicates at its upper end with the reservoir 33 and at its lower end, with a valve chamber 42. The end of the chamber 42 is closed by a reducer fitting 43, to which is connected the oil supply hose 24 by means of a suitable hose coupling 44.

The piston valve 41 is mounted on the lower end of a valve rod 50, which is slidably supported in a supporting lug 51 within the housing 30, and at its upper end in a bushing 54 through which the valve rod 50 extends. The upper end of the rod 50 is pivotally connected by a pin 55 to a link 56, which connects through a pin 57 to an arm 58, fixed to a shaft 59 which is journaled on a bracket 60, supported on top of the housing 30. A valve control lever 61 is fixedly mounted on the shaft 59, by means of which the latter can be rocked to raise and lower the valve rod 50 and thus to move the piston valve 41 vertically within the bore 40. In Figure 3, the valve 41 is shown in the upper portion of the bore 40, blocking the latter to prevent oil from passing upwardly into the reservoir 33 and thereby causing the oil to flow downwardly through the bore 40 and the valve chamber 42 to the hose 24, and thence to the cylinder 10. When the valve 41 is moved to a position just below the duct 39, the oil is permitted to flow upwardly through the bore 40 into the reservoir 33, thereby relieving the pressure in the duct 39.

A check valve 65 in the form of a poppet valve seating at the neck of the valve chamber 42, is normally urged toward closed position by means of a coil spring 66 disposed within the reducer fitting 43. The valve 65 has a stem 67 extending upwardly into a bore 68 within the valve 41 and valve rod 50 and is slidable therewithin. The bore 68 serves the purpose of supporting the valve stem 67 in such a manner that movements of either the piston valve 41 or check valve 65 has no effect on the other.

With the valve 41 in the upper end of the bore 40 as indicated, the pressure of the oil in the duct 39 forces the check valve 65 open against the action of the spring 66 to allow the oil to flow through the hose 24 to the cylinder 10. When the valve is moved to a position just below the duct 39, the oil pressure against the poppet valve 65 is relieved and the latter is closed by the spring 66, and thus holds oil in the cylinder 10, locking the piston 11 in raised position. The oil as released from the cylinder 10 by moving the piston valve 41 downwardly against a shoulder 69 on the valve stem 67, forcing the check valve 65 downwardly to an open position. The oil in the cylinder 10 is then free to flow upwardly past the poppet valve 65 and through a by-pass duct 70 around the piston valve 41, as best indicated in Figure 2. In Figure 2, the piston valve 41 is shown in the holding position in which the check valve 65 has not yet been opened, but the oil in the high pressure duct 39 is free to flow upwardly into the reservoir 33. In this position, the control lever 61 is substantially vertical.

To raise the implement, the control lever 61 is swung about the pivot 59 in a counterclockwise direction, as viewed in Figure 1, until a stop sleeve 62 on the valve rod 50 engages the top of the housing 30, and to lower the implement the lever is moved angularly to the right or in a clockwise direction. During either the raising or lowering operation, however, the piston can be locked in any position in the cylinder by merely returning the control lever to a vertical position, whereupon the oil is immediately trapped within the cylinder 10, thus stopping and holding the piston wherever it may be.

The control lever 61 comprises a threaded rod 111 formed with a hub 112 at its lower end, which is fixed to the pivot bolt 59. The hub 112 is bifurcated to provide space for a stop member 113, which will be described later in more detail. The stop member 113 is apertured to receive the bolt 59 and is free to swing about the axis of the latter.

The handle of the lever is in the form of a ball 114 mounted on a sleeve 115, which has a threaded interior surface adapted to engage the threads of the lever rod 111. The sleeve 115 embraces the rod and has a lower skirt portion 117 which serves as a stop means to engage the upper curved edge 118 of the stop member 113. The stop member 113 is extended to engage an offset portion 120 of an arm 121 which is journaled at one end on the pivot pin 59 and is apertured at the opposite end to receive the end of a control rod 122 which is turned, as at 122', into pivotal engagement therewith. The opposite end of the rod 122 is pivotally connected by a bolt 123 to an arm 124, which is rigidly fixed to the rock shaft 16.

Swinging the lever to the left as viewed in Figure 1, causes the piston to be moved toward the right in the cylinder and thereby raising the implement, while moving the lever to the right from the vertical position releases oil from the cylinder, whereupon the piston is moved to the left and thereby lowers the implement. As the piston moves toward the left, the control rod 122 moves toward the right, thereby swinging the arm 124 in a counterclockwise direction and moving the camming edge 118 of the stop member 113 upwardly into engagement with the skirt portion 117 of the lever sleeve 115, to return the latter to a vertical neutral position. Figure 1 shows the position of the parts after the piston has been stopped in lowered position. The time of engagement of the edge 118 with the skirt 117 can be advanced or retarded by screwing the sleeve in or out along the rod 111.

With the implement lowered to an intermediate working position as shown in Figure 1, the implement can be adjusted still further in a downward direction by unscrewing the handle 114 slightly, thereby moving the sleeve 115 upwardly on the rod 111, and then swinging the lever to the right into engagement with the stop 118. Then as the piston 11 moves toward the left to lower the implement, the edge 118 of the stop moves upwardly and returns the lever 61 to its neutral position. The implement can be raised slightly by swinging the lever 61 to the left and returning the same to neutral position when the implement is in the desired position of adjustment, after which the handle is screwed downwardly into engagement with the stop 118 in order to insure that the implement will return to its new position of adjustment upon subsequent raising and lowering operations.

It is now evident that with a two part lever of this description, it is very simple to adjust the working position of the implement through the power lift mechanism, which will always thereafter return the implement from transport position to the newly adjusted working position.

A detent in the form of a small ball 125 is provided between the rod 111 and the sleeve 115 in order to prevent the latter from being inadvertently moved out of any desired position by vibration of the tractor engine or any other cause. The ball is disposed within a transversely drilled hole 126 in the rod 111 and is backed up by a compression spring 127, which reacts against a plug 128 in the opposite end of the aperture 126. The spring 127 forces the ball 125 against the interior surface of the sleeve 115, the latter being provided with a plurality of notches or indentations 129 into which the ball 125 is adapted to seat. As indicated in Figure 4, the present embodiment is provided with four notches 129, which are preferably formed by driving a tool of square cross section into the end of the sleeve. Another purpose of the ball and notches is to provide the operator with an indication as to the amount of adjustment which he is making upon the implement. This indication is manifested by the number of clicks, four to each revolution of the handle, which can be distinctly felt by the operator when making the adjustment.

The lever 61 is held in any position by a pair of friction plates 130, 131, attached rigidly to the bolt 59 and bracket 60, and are held in frictional interengagement by means of a compression spring 132, which embraces the threaded end of the bolt 59 on the opposite side of the bracket, and reacts against a pair of lock nuts 133. The pressure between the friction plates 130, 131 can be adjusted by adjusting the nuts 133 in or out along the bolt 59.

We do not intend our invention to be limited to the exact details shown and described herein, except as limited by the claims which follow.

We claim:

1. In a device of the class described, the combination of a power actuated movable member, a control lever associated therewith and pivotally mounted for swinging movement from a neutral position to effect a movement of said member in a certain direction, a handle for manually swinging said lever to control said member, said handle being mounted on said lever by means providing for movement relative thereto about an axis disposed generally perpendicular to the axis of movement of said lever, stop means attached to said handle and operative to engage cooperative stop means to control the actuation of said lever and thus to limit the extent of movement of said power actuated member, said stop means being shiftable by moving said handle relative to said lever, thereby changing the terminal position of said member.

2. In hydraulic mechanism, the combination of a pair of cooperative cylinder and piston members movable relative to each other, a valve control lever associated therewith pivotally supported to swing from a neutral position to effect a relative movement of said members in a certain direction, a handle for manually swinging said lever to control said members, said handle being mounted on said lever by means providing for movement relative thereto about an axis separate from the pivotal supporting axis of the lever, and a pair of cooperative stops connected with said handle and one of said members, respectively, said stops being interengageable to return said lever to said neutral position responsive to movement of said members to a certain terminal position, said terminal position being adjustable by rotating said handle relative to said control lever to shift its associated stop relative to the cooperative stop on said one member.

3. In a device of the class described, the combination of a power actuated movable member, a control lever associated therewith and pivotally mounted for swinging movement from a neutral position to effect a movement of said member in a certain direction, a handle for manually swinging said lever to control said member, said handle being mounted on said lever by means providing for adjustment longitudinally of said lever, stop means on said handle and shiftable therewith, and cooperative stop means on said movable member engageable with said handle stop means to return said lever to neutral position.

4. In a device of the class described, the combination of a power actuated movable member, a control lever associated therewith and pivotally mounted for swinging movement from a neutral position to effect a movement of said member, said lever comprising a threaded rod, a handle threaded on said rod and adjustable longitudinally of the latter by rotation thereof relative to the rod, means on said handle serving as a stop, and cooperative stop means engageable with the latter to limit the extent of swinging movement of said lever.

5. In a device of the class described, the combination of a power actuated movable member, a control lever associated therewith and pivotally mounted for swinging movement from a neutral position to effect a movement of said member, said lever comprising a threaded rod, a handle threaded on said rod and adjustable longitudinally of the latter by rotation thereof relative to the rod, means on said handle serving as a stop, and cooperative stop means mounted on said movable member engageable with said handle stop to return said lever to said neutral position when said movable member reaches a terminal position, said terminal position being adjustably determined by adjusting said handle along said lever.

6. In combination, a control lever pivotally mounted for swinging movement and including a threaded rod portion, a handle threaded on said rod and adjustable longitudinally of the latter by rotation thereof relative to the rod, means on said handle serving as a stop, and cooperative stop means engageable with the latter to limit the extent of swinging movement of said lever in one direction, said stops being adjustable relative to each other by rotation of said handle.

7. In combination, a control lever pivotally mounted for swinging movement and including a threaded rod portion, a handle comprising a sleeve embracing said lever and having a part serving as a handle for swinging said lever, said sleeve being threaded on said rod portion and adjustable longitudinally thereof by rotation relative to the lever, cooperative stop means engageable with said sleeve in any of a range of adjusted positions to swing said lever, and means for moving said stop means into said engagement.

8. In combination, a control lever pivotally mounted for swinging movement and including a threaded rod portion, a handle comprising a sleeve embracing said lever and having a part serving as a handle for swinging said lever, said sleeve being threaded on said rod portion and adjustable longitudinally thereof by rotation relative to the lever, a power actuated movable member controlled by said lever, an arm pivotally mounted adjacent said lever and having a camming portion movable into engagement with said sleeve, and means connecting said power actuated member with said arm for moving the latter into engagement with said sleeve to actuate said lever, said sleeve being adjustable toward and away from said camming portion by rotating said sleeve.

THEOPHILUS BROWN.
FRANK T. COURT.